United States Patent [19]

Clark et al.

[11] Patent Number: 5,051,246

[45] Date of Patent: Sep. 24, 1991

[54] CRYSTALLINE ALUMINOPHOSPHATE COMPOSITIONS

[75] Inventors: David M. Clark; Ronald J. Dogterom, both of Amsterdam, Netherlands

[73] Assignee: Shell Oil Company, Houston, Tex.

[21] Appl. No.: 523,677

[22] Filed: May 15, 1990

[30] Foreign Application Priority Data

Nov. 24, 1989 [GB] United Kingdom ............. 8926602

[51] Int. Cl.$^5$ .................. C01B 25/36; B01J 27/18
[52] U.S. Cl. .................. 423/305; 502/208; 502/209; 502/210; 502/211; 502/212; 208/46
[58] Field of Search ........... 423/305, 306, 277, 279, 423/326, 328, 329; 502/214, 208, 209, 210, 211, 212; 208/46

[56] References Cited

U.S. PATENT DOCUMENTS

| | | | |
|---|---|---|---|
| 4,310,440 | 1/1982 | Wilson et al. | 423/305 |
| 4,567,029 | 1/1986 | Wilson et al. | 423/306 |
| 4,673,559 | 6/1987 | Derovane et al. | 423/306 |

Primary Examiner—R. Bruce Breneman

[57] ABSTRACT

Crystalline aluminophosphates and related compounds having in the as-synthesized anhydrous form the chemical composition: $m'R(X_nAl_qP_x)O_2$, wherein R represents 1,3-diaminopropane, X represents one or more elements which can be substituted for Al and/or P, wherein $m' = 0.01 – 0.33$
$n = 0 – 0.40$
$q = 0.30 – 0.60$
$x = 0.30 – 0.60$ and wherein $n+q+x=1$ and having an X-ray diffraction pattern containing at least the lines as given in Table A or B.

The compounds can be prepared from a forming solution or gel comprising a source of aluminum, a source of phosphorus, 1,3-diaminopropane and optionally a source of at least one component X, wherein the appropriate forming components are initially present in certain molar ratios and which mixture is kept at elevated temperature for a period of time sufficient to produce a crystalline aluminophosphate or related compounds.

12 Claims, No Drawings

CRYSTALLINE ALUMINOPHOSPHATE COMPOSITIONS

FIELD OF THE INVENTION

The present invention relates to novel crystalline aluminophosphate compositions and a process for preparing such aluminophosphate compositions.

BACKGROUND OF THE INVENTION

Crystalline aluminophosphate compositions are well known materials which find a promising reception in industry as new generations of molecular sieves, catalyst carriers as well as catalysts. For instance, in U.S. Pat. No. 4,310,440, the preparation of various crystalline aluminophosphates is described from reaction mixtures containing inter alia organic structure directing or templating agents including tetrapropylammonium hydroxide, quinuclidine, t-butylamine and ethylenediamine.

Classes of these materials comprise compositions crystallized in the $AlPO_4$, $SAPO_4$ (siliconaluminophosphate), $MeAPO_4$ (metalloaluminophosphate) and $ElAPO_4$ (non-metal substituted aluminophosphate) families.

It has now been found that novel crystalline aluminophosphates and related compounds, e.g. of the $AlPO_4$-, $SAPO_4$- and $MeAPO_4$-type can be prepared from reaction gels or solutions when use is made of the appropriate forming components and a certain organic diamine.

SUMMARY OF THE INVENTION

The present invention relates to crystalline aluminophosphates and related compounds having in the as-synthesized anhydrous form the chemical composition:

$m'R(X_nAl_qP_x)O_2$, wherein R represents 1,3-diaminopropane as defined hereinbelow, X represents one or more elements which can be substituted for Al and/or P, wherein
$m' = 0.01-0.33$
$n = 0-0.40$
$q = 0.30-0.60$
$x = 0.30-0.60$ and wherein $n+q+x=1$, and having an X-ray diffraction pattern containing at least the lines as given in Table A or B.

TABLE A

| d (A) | Intensity |
| --- | --- |
| 11.2 ± 0.2 | vs |
| 7.1 ± 0.2 | w |
| 6.6 ± 0.1 | m |
| 6.1 ± 0.1 | w |
| 4.7 ± 0.1 | w-m |
| 4.02 ± 0.05 | m |
| 3.78 ± 0.05 | m |
| 3.70 ± 0.05 | w-m |
| 3.50 ± 0.03 | m-s |
| 2.94 ± 0.03 | m |
| 2.69 ± 0.03 | w-m |

TABLE B

| d(A) | Intensity |
| --- | --- |
| 9.6 ± 0.2 | vs |
| 8.4 ± 0.2 | vw-w |
| 6.7 ± 0.1 | w-m |
| 5.6 ± 0.1 | w |
| 4.8 ± 0.1 | w |
| 4.38 ± 0.05 | w-m |
| 4.08 ± 0.05 | vw-w |

TABLE B-continued

| d(A) | Intensity |
| --- | --- |
| 3.83 ± 0.05 | w-m |
| 3.63 ± 0.05 | vw-w |
| 3.54 ± 0.03 | m |
| 3.47 ± 0.03 | m |
| 2.93 ± 0.03 | vw-w |
| 2.80 ± 0.03 | w |

DESCRIPTION OF THE PREFERRED EMBODIMENTS

In particular, the present invention relates to aluminophosphates and related compounds having the chemical composition as described hereinabove, wherein
$m' = 0.05-0.20$
$n = 0-0.30$
$q = 0.35-0.60$ and
$x = 0.35-0.60$.

Element X, which can be substituted for aluminum and/or phosphorus in the crystalline aluminophosphates and related compounds according to the present invention, can suitably be one or more of beryllium, magnesium, titanium, manganese, iron, cobalt, zinc, vanadium, nickel, chromium, silicon, lithium, boron, gallium, germanium and arsenic. Typically, said element X will be one or more of magnesium, titanium, manganese, iron, cobalt, zinc, nickel, silicon, gallium or germanium, and preferably one or more of magnesium, titanium, manganese, iron, cobalt and silicon.

It should be noted that the expression "1,3-diaminopropane", as used throughout this specification, is meant to include compounds having the basic 1,3-diaminopropane structure of three carbon atoms linearly bridging two nitrogen atoms which nitrogen atoms preferably carry each two hydrogen atoms but which may also carry each up to three lower alkyl groups, preferably methyl groups. In the case of three hydrogen and/or lower alkyl groups attached to a nitrogen atom a cation is obtained which necessitates the presence of an anion to cause electroneutrality.

In the event that $n>0$ it will be appreciated that the as-synthesized anhydrous form of the crystalline aluminophosphates and related compounds according to the present invention also contains an appropriate charge-balancing cation such as a proton or a protonic or alkylated form of R as described hereinbefore.

An example of a novel crystalline aluminophosphate according to the present invention and belonging to the $AlPO_4$-class has in the as-synthesized anhydrous form the following chemical composition:

0.09 R $(Al_{0.5}P_{0.5})O_2$ having an X-ray diffraction pattern as given in Table 1.

A further example of a novel crystalline aluminophosphate according to the present invention and belonging to the $AlPO_4$-class has in the as-synthesized form the following chemical composition:

0.04 R $(Al_{0.5}P_{0.5})O_2$ having an X-ray diffraction pattern containing at least the lines as given in Table 2.

It should be understood that the anhydrous form referred to in this specification may also contain chemically bound water.

The present invention also relates to novel crystalline aluminophosphates and related compounds having in the calcined substantially R-free form the general chemical composition: $(X_nAl_qP_x)O_2$, wherein X, n, q and x have the meaning as described hereinbefore and wherein $n+q+x=1$.

The present invention also relates to a process for preparing novel crystalline aluminophosphates as well as related compounds as defined hereinbefore from a forming solution or gel comprising a source of aluminum, a source of phosphorus, 1,3-diaminopropane and optionally a source of at least one component X, which mixture is kept at elevated temperature for a period of time sufficient to produce a crystalline aluminophosphate or related compound followed by separating off the crystalline product obtained and drying, in which solution or gel the various components are initially present in the following molar ratios:

$R:Al_2O_3 \geq 0.3-3$
$X:Al_2O_3 = 0-2$
$P:Al_2O_3 = 0.3-1.3$
$H_2O:Al_2O_3 = 30-500$, wherein X and R have the meanings as defined hereinbefore.

The crystalline aluminophosphates and related compounds according to the present invention are preferably prepared from a forming solution or gel in which the various components are initially present in the following molar ratios:

$R:Al_2O_3 = 0.5-2$
$X:Al_2O_3 = 0-2$
$P:Al_2O_3 = 0.4-1.25$
$H_2O:Al_2O_3 = 35-320$.

Crystalline aluminophosphates and related compounds according to the present invention having in the as-synthesized anhydrous form an X-ray pattern containing at least the lines as given in Table A are normally prepared from forming solutions or gels while keeping the temperature below 180° C., in particular between 100° C. and 160° C. Crystalline aluminophosphates and related compounds according to the present invention having in the as-synthesized anhydrous form an X-ray pattern containing at least the lines as given in Table B are normally prepared from forming solutions or gels while keeping the temperature at least at 180° C., in particular in the range from 180° C. to 230° C. The use of aqueous forming solutions or gels is preferred.

The process according to the present invention can be carried out at autogenous pressure as well as at an elevated pressure. Normally, the novel crystalline aluminophosphates and related compounds will be produced when the forming solution or gel has been kept under the appropriate conditions for a period of time allowing the proper structure to be formed.

Preferably, the process according to the present invention is carried out for a period of time ranging between 18 hours and 144 hours, in particular between 24 and 96 hours.

Examples of suitable aluminum sources comprise aluminum oxide, such as gibbsite, boehmite, pseudo-boehmite and aluminium alkoxides, such as aluminum isopropoxide. Also mixtures of various aluminium sources can be suitably applied. Preference is given to the use of boehmite and aluminum isopropoxide.

Suitable phosphorus sources comprise phosphorus acids and derivatives thereof such as esters, phosphorus oxides, phosphates and phosphites, preferably orthophosphoric acid. Also mixtures of phosphorus sources can be applied.

Examples of suitable sources of X comprise the appropriate chlorides, iodides, bromides, nitrates, sulfates and acetates, preferably acetates, as well as oxides.

If desired, the crystalline aluminophosphates or related compounds produced can be calcined after drying to produce the desired calcined substantially R-free aluminophosphates or related compounds.

It has been found that agitation can advantageously be applied to produce the desired crystalline aluminophosphates or related compounds from the forming solution or gel.

The novel crystalline aluminophosphates and related compounds according to the present invention can suitably be used as molecular sieves, catalysts or as catalyst carriers in the operation of various catalytic processes. If desired, one or more (catalytically) active species, in particular protons and/or precursors thereof and/or one or more metal(s) (compounds) of Group III and/or the Transition Metals and/or Rare Earth metals and/or precursors thereof, can be incorporated into the crystalline aluminophosphates and related compounds according to the present invention. They can be incorporated by well-known techniques such as, for example, impregnation and ion-exchange.

The invention will now be described by the following Examples which are intended to be illustrative and are not to be construed as limiting the invention.

EXAMPLE I

A crystalline $AlPO_4$, referred to as SCS-13, was prepared by mixing 9.8 grams of pseudo-boehmite, 15.4 grams of 85% $H_3PO_4$, 4.9 grams of 1,3-diaminopropane ($C_3DN$) and 45.1 grams of water to form a mixture having a composition on a molar basis of 1 $Al_2O_3$:1 $P_2O_5$:1 $C_3DN$:45 $H_2O$. This mixture was consequently maintained at 120° C. for 72 hours until a crystalline compound was obtained.

After synthesis the crystalline compound produced was separated from the reaction mixture by filtration, water washed, and dried at 120° C.

The crystalline compound obtained had in the anhydrous form the following chemical composition:

0.09 R $(Al_{0.5}P_{0.5})O_2$ (R = 1,3-diaminopropane)

and an X-ray diffraction pattern containing at least the line as given in Table 1 below.

TABLE 1

| d(A) | Intensity |
|------|-----------|
| 11.20 | vs |
| 7.15 | w |
| 6.59 | m |
| 6.14 | w |
| 4.68 | w-m |
| 4.00 | m |
| 3.78 | m |
| 3.70 | w-m |
| 3.50 | m-s |
| 2.94 | m |
| 2.69 | w-m |

EXAMPLE II

A crystalline $AlPO_4$, referred to as SCS-23, was prepared in an experiment which was carried out in a substantially analogous manner as described in Example I, except that the reaction was carried out at 200° C. for 72 hours.

The crystalline $AlPO_4$ obtained had in the anhydrous form the following chemical composition:

0.04 R $(Al_{0.5}P_{0.5})O_2$ (R = 1,3-diaminopropane)

and an X-ray diffraction pattern containing at least the lines as given in Table 2 hereinbelow.

TABLE 2

| d(A) | Intensity |
|---|---|
| 9.59 | vs |
| 8.38 | vw-w |
| 6.69 | w-m |
| 5.57 | w |
| 4.79 | w |
| 4.38 | w-m |
| 4.08 | vw-w |
| 3.84 | w-m |
| 3.63 | vw-m |
| 3.54 | m |
| 3.48 | m |
| 2.93 | vw-w |
| 2.80 | w. |

EXAMPLE III

The experiment described in Example I was repeated but using 27.2 grams of aluminum isopropoxide as the aluminum source, 48.1 grams of $H_2O$ and a temperature of 160° C.

After work up, SCS-13 was obtained having essentially the same lines in its X-ray diffraction pattern as already described in Table 1.

What is claimed is:

1. A crystalline aluminophosphate composition comprising in an as-synthesized anhydrous form a chemical composition:

$m'R(Al_qP_x)O_2$, wherein R represents 1,3-diaminopropane, and wherein
   $m' = 0.01-0.33$
   $q = 0.30-0.60$
   $x = 0.30-0.60$ and wherein $q+x=1$, and having an X-ray diffraction pattern containing at least the lines as given in Table A:

TABLE A

| d(A) | Intensity |
|---|---|
| 11.2 ± 0.2 | vs |
| 7.1 ± 0.2 | w |
| 6.6 ± 0.1 | m |
| 6.1 ± 0.1 | w |
| 4.7 ± 0.1 | w-m |
| 4.02 ± 0.05 | m |
| 3.78 ± 0.05 | m |
| 3.70 ± 0.05 | w-m |
| 3.50 ± 0.03 | m-s |
| 2.94 ± 0.03 | m |
| 2.69 ± 0.03 | w-m. |

2. The crystalline aluminophosphate composition of claim 1 wherein
   $m' = 0.05-0.20$
   $q = 0.35-0.60$ and
   $x = 0.35-0.60$.

3. The crystalline aluminophosphate composition of claim 1 having an X-ray pattern containing at least the lines as given in Table 1:

TABLE 1

| d(A) | Intensity |
|---|---|
| 11.20 | vs |
| 7.15 | w |
| 6.59 | m |
| 6.14 | w |
| 4.68 | w-m |
| 4.00 | m |
| 3.78 | m |
| 3.70 | w-m |

TABLE 1-continued

| d(A) | Intensity |
|---|---|
| 3.50 | m-s. |

4. The crystalline aluminophosphate composition of claim 1 wherein said composition additionally contains one or more catalytically active species.

5. The crystalline aluminophosphate composition of claim 4 wherein the catalytically active species is selected from the group consisting of protons, precursors of protons, transition metals, precursors of transition metals, rare earth metals, precursors of rare earth metals, and mixtures thereof.

6. A process for preparing a crystalline aluminophosphate composition comprising in an as-synthesized anhydrous form a chemical composition:

$m'R(Al_qP_x)O_2$, wherein R represents 1,3-diaminopropane, and wherein
   $m' = 0.01-0.33$
   $q = 0.30-0.60$
   $x = 0.30-0.60$ and wherein $q+x=1$, and having an x-ray diffraction pattern containing at least the lines as given in Table A:

TABLE A

| d(A) | Intensity |
|---|---|
| 11.2 ± 0.2 | vs |
| 7.1 ± 0.2 | w |
| 6.6 ± 0.1 | m |
| 6.1 ± 0.1 | w |
| 4.7 ± 0.1 | w-m |
| 4.02 ± 0.05 | m |
| 3.78 ± 0.05 | m |
| 3.70 ± 0.05 | w-m |
| 3.50 ± 0.03 | m-s |
| 2.94 ± 0.03 | m |
| 2.69 ± 0.03 | w-m | from a forming solution or gel comprising a source of aluminum, a source of phosphorus and 1,3-diaminopropane, which solution or gel is kept at a temperature between 100° C. and 160° C. for a period of time sufficient to produce said crystalline aluminophosphate composition followed by separating off the crystalline product obtained and drying, wherein said solution of gel has the various components initially present in the following molar ratios:
   $R:Al_2O_3 = 0.3-3$
   $P:Al_2O_3 = 0.3-1.3$
   $H_2O:Al_2O_3 = 30-500$.

7. The process of claim 6 wherein the various components in the forming solution or gel are initially present in the following molar ratios:
   $R:Al_2O_3 = 0.5-2$
   $P:Al_2O_3 = 0.4-1.25$
   $H_2O:Al_2O_3 = 35-320$.

8. The process of claim 6 wherein the forming solution or gel is kept for a period of time ranging between 18 and 144 hours under crystal-forming conditions.

9. The process of claim 6 wherein said source of aluminum is selected from the group consisting of aluminum oxides, aluminum alkoxides and mixtures thereof.

10. The process of claim 9 wherein said source of aluminum is selected from the group consisting of aluminum isopropoxide, boehmite and pseudo-boehmite.

11. The process of claim 6 wherein said source of phosphorus is selected from the group consisting of phosphorus acids, esters of phosphorus acids, phosphorus oxides, phosphates, phosphites and mixtures thereof.

12. The process of claim 11 wherein said source of phosphorus is phosphoric acid.

* * * * *